United States Patent [19]

Leture et al.

[11] Patent Number: 5,292,553
[45] Date of Patent: Mar. 8, 1994

[54] ULTRA THIN ZIRCON COATING AND MEMBRANE

[75] Inventors: Phillipe J. A. M. Leture, Lyon; Alain Dauger, Limoges; Michel Prassas, Paris, all of France

[73] Assignee: Corning Incorporated, Corning, N.Y.

[21] Appl. No.: 952,053

[22] Filed: Sep. 28, 1992

[30] Foreign Application Priority Data

Oct. 1, 1991 [FR] France .................. 91 12038

[51] Int. Cl.$^5$ ............................................. B05D 5/00
[52] U.S. Cl. .................... 427/244; 427/245; 427/246; 427/376.2; 427/226
[58] Field of Search ............... 427/376.2, 244, 245, 427/246, 226

[56] References Cited

U.S. PATENT DOCUMENTS 4,562,021 12/1985 Alary et al. ..................... 264/43
4,738,874 4/1988 Berardo et al. .................. 427/244
5,032,556 6/1991 Mori et al. ...................... 501/106

*Primary Examiner*—Shrive Beck
*Assistant Examiner*—David M. Maiorana
*Attorney, Agent, or Firm*—Richard N. Wardell

[57] ABSTRACT

A process to synthetize zircon as an ultra thin coating and comprising: (A) mixing an alcoholic sol resulting from hydrolysis of a silicon alkoxide with an alcoholic solution of a chelated zirconium compound and in the presence of and with a doping agent, until a homogenous mixed sol is obtained; (B) forming a matured sol containing colloidal particles and/or the polymeric entities from the mixed sol; (C) forming a coating of the matured sol on a microporous substrate; (D) drying slowly the sol coating into a gel coating free of flaws; and (E) firing the gel coating at a temperature of 900° to 1500° C. to form an ultra thin zircon layer. Use of the zircon layer obtained above as an ultrafiltration membrane or as a protective coating.

14 Claims, No Drawings

ULTRA THIN ZIRCON COATING AND MEMBRANE

The present invention provides a process to synthetize zircon as an ultra thin coating.

Presently the inorganic membranes for ultrafiltration are usually made of oxides of aluminum, zirconium or titanium. Those membranes are produced by "sol-gel" type processes, such as those described in published patent documents FR-A-2 550 953 and EP-A-0 242 208.

Because of the outstanding chemical durability of zircon ($ZrSiO_4$), it would be very useful to have ultrafiltration membranes of that material, in particular to operate ultrafiltration in extreme pH conditions.

Nevertheless zircon ultrafiltration membranes are absent from the previous art. The reason might be that the much faster reactivity of the zirconium alkoxides, in contrast to the silicon alkoxides, during the hydrolysis and condensation reactions taking place in the sol-gel processes normally produces separated precipitation of zirconia ($ZrO_2$), which makes it impossible to obtain zircon.

In order to fill in that gap, the present invention provides a process to prepare zircon as ultra thin layers.

SUMMARY OF THE INVENTION

We have discovered that it is possible to produce ultra thin zircon coatings by Solgel type processes, provided the silicon alkoxide is prehydrolyzed, and the zirconium alkoxide or other appropriate compound is chemically modified to slow down its hydrolysis and condensation kinetics, and provided those means are combined with the use of a doping agent (an additive) facilitating zircon crystallization.

More precisely the present invention provides a process to prepare zircon as an ultra thin coating, which process comprises:

A) mixing (i) a homogenous alcoholic sol resulting from hydrolysis and partial condensation of a silicon alkoxide with (ii) a homogenous solution of a zirconium compound chelated in an alcohol and (iii) in the presence of a doping agent being soluble in the resulting mixture and promoting zircon crystallization, with proportions of the sol and the solution yielding a molar ratio Si/Zr close or equal to 1, until a homogenous mixed sol is obtained;

B) forming a matured sol containing colloidal particles and/or polymeric entities by a procedure selected from:
  (i) stirring the mixed sol for approximately 30 minutes to 24 hours under conditions of temperature and stirring to obtain and avoid gelling the matured sol, and
  (ii) gelling the mixed sol, drying and forming a powder of the resultant gel, and mixing the powder with acidified water to obtain the matured sol;

C) forming a coating of the matured sol on a microporous substrate;

D) drying the sol coating sufficiently slowly to convert the sol coating to a gel coating and avoid flaws in the gel coating;

E) firing the gel coating on the substrate at a temperature of 900° to 1500° C. to form an adherent ultra thin zircon layer on the microporous substrate.

By "ultra thin layer" we mean a layer which is less than 2 $\mu$m thick, and can be as thin as 0.3 $\mu$m.

The instant invention concerns also the use of an ultra thin porous coating in products such as: (1) an ultrafiltration device comprising an ultra filtration membrane supported on a microporous substrate and where the membrane is a porous, ultra thin, zircon layer produced by the above described process, and (2) an article comprising a microporous substrate having a surface to be protected and a dense, ultra thin, zircon layer coating the surface to be protected, which layer is produced by the above described process.

DETAILED DESCRIPTION

The homogenous alcoholic sol resulting from hydrolysis and partial condensation of a silicon alkoxide which is used as a reagent in step (A) can be prepared for example by preparing an acidified aqueous alcoholic solution, by adding a silicon alkoxide under stirring, then maturing it at 20° to 80° C., e.g. for 5 minutes to 24 hours, to let hydrolysis and partial condensation of the alkoxide be achieved.

The silicon alkoxide can be, for example, tetramethyl orthosilicate or tetraethylorthosilicate. The molar ratio water/silicon alkoxide can be between approximately 4 and 20. If that ratio is lower than 4, hydrolysis is not complete while if it is higher than 20 the excess of available water can produce a precipitation. The preferred value of that ratio is around 10. The alcohol for the alcoholic solution can be chosen among those where the alkoxide is soluble. Examples are methanol, ethanol, propanol, dimethoxy-methanol, etc. The pH of the acidified alcoholic solution must be adjusted depending on the particular alkoxide. For tetraethyl and orthosilicate (TEOS), and the optimal pH is between 2.5 and 3.5.

After maturing, the sol can be optionally made basic by addition of a base so that the doping agent can be converted into a hydroxide reducing the mobility of the doping ions.

The homogenous solution of the zirconium compound chelated in an alcohol, used as the reagent in step (A), can be obtained, for example, by preparing a homogenous alcoholic solution of the chelating agent, then adding the zirconium compound under stirring.

The chelating compound, intended to reduce the reactivity of the zirconium compound with water, can be chosen among various classes of compounds. Among others we can make mention of $\beta$-diketones and aminoalcohols, the most representative examples being acetylacetone and triethanolamine, respectively. Other compounds, possibly useful are polyols such as glycerol or ethylene-glycol, carboxylic acids, hydrogen peroxide, $\alpha$-hydroxy-acids such as glycolic acid or salicylic acid. The molar ratio chelating compound/zirconium compound can be from 0.1 to 1, preferably between 0.4 and 0.8, depending on how much the reactivity of the zirconium compound has to be reduced.

As zirconium compound, one can use a zirconium alkoxide such as zirconium tetra-n-propoxide or zirconium tetra-n-butoxide, or else a zirconium salt or a zirconyl salt soluble in the selected alcohol, such as zirconyl chloride or nitrate.

The alcohol to be used to prepare the homogenous solution must be selected according to the zirconium compound so that they are mutually soluble. Examples of alcohols usually suitable are methanol, ethanol, propanol, dimethoxy-methanol, etc.

The sol prepared from the silicon alkoxide and the solution of chelated zirconium compound must be mixed in such proportion that the molar ratio Si/Zr is close or equal to 1, since the aim of the process is to produce zircon ZrSiO$_4$.

The sol prepared from the silicon alkoxide and the chelated zirconium compound solution must be mixed in the presence of, e.g. with, a doping agent which is soluble in the resulting mixture and promotes zircon crystallization.

The doping agent can be selected among the soluble compounds of Sc, Ti, V, Cr, Mn, Fe, Co, Ni, Cu, Zn, Nb, Ta and Pr. Soluble compounds of those metals, except of vanadium, can be found among their mineral salts such as chlorides or nitrates, among their carboxylates such as acetates, among their alkoxides, etc. As usable vanadium compounds, vanadyl triisopropoxide is one, which can be modified with acetylacetone to avoid a too fast reaction with water, and ammonium metavanadate could also be used.

At present it is preferred to use as a doping agent a copper soluble salt such as dihydrated copper dichloride CuCl$_2$.2H$_2$O, or monohydrated copper diacetate Cu(CH$_3$COO)$_2$.H$_2$O.

Practically, the doping agent can be incorporated either into the sol prepared from the silicon alcoxide, or into the zirconium compound solution, or into both.

The molar ratio doping agent/(silicon alkoxide+zirconium compound) can be from 0.01 to 0.25 approximately.

The sum of the molar concentrations of silicon alkoxide in the sol and of the zirconium compound in the homogenous alcoholic solution can be approximately between 0.1 and 2 moles/liter.

After blending, the mixed sol can mature with stirring for approximately 30 minutes to 24 hours at a temperature of 20° to 80° C., but taking care that the sol does not gel.

Alternatively the mixed sol can mature by gelling it under conditions therefor, drying the resulting gel, for example between 60° to 150° C., to obtain a powder, and then dissolving or mixing that powder, possibly after grinding, into acidified water to obtain a sol.

The matured sol obtained in either above alternative is used to lay, for example by suction, an even homogenous coating of the colloidal particles and/or the polymeric entities from the sol onto an appropriate microporous substrate.

The microporous substrate can be a tubing (particularly suitable for ultrafiltration applications), a plate or any other shape. Preferably its pores have a diameter lower than 0.2 μm and its surface roughness does not exceed 1 μm, to minimize the risk of flaws or large pores in the coating. Such a substrate can be made in 2 steps. Firstly we make, e.g. by extrusion or by slip casting, a macroporous substrate, from a powder with a main grain size around 5 to 100 μm. Then we coat the substrate with a layer of thin powder, the main grain size of the powder being 0.25 μm and the biggest size being <1 μm, by slip casting from a slip perfectly dispersed and deaerated to avoid any flaw larger than 1 μm. After drying, the microporous substrate is consolidated by firing at high temperature.

The powders used to produce the substrate can be either ceramic powders, such as zircon powder obtained by grinding, or metal powders, such as nickel. The selection of the powder is not neutral, since we have discovered that certain microporous substrates, in particular alumina, inhibit zircon crystallization in the presence of a doping agent consisting of copper, cobalt or iron. We have not verified if that inhibition occurs also with other doping agents.

The coating layed onto the microporous substrate is then dried very slowly to avoid flaws. Typically that drying is done at a temperature less than or equal to 50° C. for several hours. During that drying the sol becomes a gel.

Once dried, the coating is fired up to a maximum temperature between 900° and 1500° C., preferably between 1000° and 1250° C. The heating rate must be slow enough (5° C./minute maximum) until about 500° C., at which temperature the last organic compounds are eliminated. The maximum temperature will control the porosity of the zircon layer obtained, said porosity being lower when the maximum temperature is higher. Practically, if a porous layer useful as an ultrafiltration membrane is desired, the coating will be fired preferably up to about 1000°–1120° C. If conversely a dense zircon layer is desired, the coating will be fired at least at 1150° C., preferably between 1150° and 1250° C., in particular about 1200° C. Such a dense zircon layer, due to its excellent chemical and thermal resistance, is useful as a protective coating.

The coatings are very thin, between 0.3 and 2 μm, depending on the operating conditions for preparation of the mixed sol and of the coating itself. In particular, we have found that, when the process is applied including the step (B)(i), the coatings are thinner than when the step (B)(ii) is applied. When the maximum firing temperature does not exceed about 1120° C., preferably 1100° C., the layers are porous, with a very small pore diameter, typically between 30 and 50 nm, which combined with their chemical durability make them very appropriate for ultrafiltration applications, in particular in extreme pH conditions.

The present invention will now be illustrated by the following non-limitative examples.

In these examples, as silicon alkoxide we used tetra ethylorthosilicate (abbreviation TEOS) containing at least 98% v/v (by volume) of active reagent, produced by Aldrich Co., and as zirconium compound we used zirconium tetra-n-propoxide containing 70% v/v of Zr(OPr). where Pr stands for propyl, produced by Alfa Co.

As microporous substrate we used a 10 mm internal diameter tubing, formed along the general process above, from zircon particles, and fired at 1200° C. for one hour.

Example I

Into a hermetically sealed flask fitted with a magnetic stirrer, we introduced 72 ml of ethanol. Then while stirring the ethanol, we added 3.9 ml of water at pH=3. That pH was obtained, with water previously ion exchanged and filtered, by adding an appropriate quantity nitric acid. After mixing for 5 minutes, we added 4.35 ml of TEOS. The mixture was let to mature for 1 hour at 40° C. while stirring it. Then we added 0.42 g of dihydrated copper dichloride, and dissolved it by stirring the mixture for 5 minutes. The sol so obtained is designated sol A, and the time at the end of the above 5 minutes stirring is designated t$_0$.

Concurrently with the preparation of sol A, we introduced 66 ml of propanol-1 into a hermetically sealed flask fitted with a magnetic stirrer. Then while stirring the propanol, we added 1.2 ml of acetylacetone. After 5 minutes stirring, we quickly added 8.25 ml of Zr(OPr)$_4$. Such chemical modification of Zr(OPr) was carried out for 12 hours at 40° C. with continued stirring. The solution so obtained is designated solution B.

At time $t_0$, while strongly stirring sol A, we quickly poured solution B into sol A. With gentler stirring for 7 hours, we let the resulting mixed sol mature at 40° C.; then we brought it back to room temperature, which resultant matured sol is designated sol C. We filled the microporous zircon tube with sol C by suction, maintained it full for 4 minutes, and then drained it smoothly.

We dried the coating obtained above at 40° C. in wet atmosphere for 20 hours. Then we fired it at 1100° C. for 5 hours, the heating rate being 3° C./minute. Thus, we finally obtained a porous zircon membrane with pore size around 30–50 nm.

Example 2

Into a hermetically sealed flask fitted with a magnetic stirrer, we introduced 87 ml of ethanol. Then while stirring the ethanol, we added 3.3 ml of water at pH=3. That pH was obtained by taking ion exchanged and filtered water, and adding the adequate quantity of nitric acid to it. After mixing for 5 minutes, we added 4.35 ml of TEOS. We let the mixture mature for 1 hour at 40° C. while stirring it. Then, with continued stirring, we added 0.6 ml of water at pH 12 (that pH was obtained, with ion exchanged and filtered water, by adding the adequate quantity of ammonium hydroxide to it), and we further continued stirring for 5 minutes. Finally we added 0.42 g of dihydrated copper dichloride and dissolved it while stirring the mixture for 5 minutes. The sol so obtained is designated sol D, and the time at which the above 5 minutes stirring was finished is designated $t_0$.

Concurrently with the preparation of sol D, we introduced 81 ml of propanol-1 into a hermetically sealed flask fitted with a magnetic stirrer. Then, while stirring the propanol, we added 1.2 ml of acetylacetone. After mixing for 5 minutes, we quickly added 8.25 ml of $Zr(OPr)_4$. Such chemical modification of $Zr(OPr)_4$ was carried out for 1 hour at 40° C. with continued stirring. Thus, we obtained solution E.

At time $t_0$, while stirring sol D, we quickly poured solution E into sol D. With gentler stirring for 11 hours, we let the mixed sol F mature at 40° C.; then we brought it back to room temperature. We filled the zircon microporous tube with sol F by suction, maintained it full for 4 minutes, and then drained it smoothly.

We dried the coating obtained above at 40° C. in wet atmosphere for 2 hours, and then fired it at 1100° C. for 5 hours. Thus, we finally obtained a porous zircon membrane with pore size around 30–50 nm.

Example 3

We introduced 73 ml of ethanol into a hermetically sealed flask fitted with a magnetic stirrer. While stirring the ethanol, we added 3.3 ml of water at pH=3. That pH was obtained by taking ion exchanged and filtered water, and adding the adequate quantity of nitric acid. After mixing for 5 minutes, we added 2.9 ml of TEOS. We let the mixture mature for 1 hour at 40° C. while stirring it. Then we added 0.33 g of monohydrated copper diacetate and dissolved it while stirring the mixture for 5 minutes. The sol so obtained is designated sol G, and the time at which the above 5 minutes stirring was finished is designated $t_0$.

Concurrently with the preparation of sol G, we introduced 68 ml of propanol-1 into a flask fitted with a magnetic stirrer. Then while stirring the propanol, we added 1 ml of triethanolamine. After mixing for 5 minutes, we quickly added 5.5 ml of $Zr(OPr)_4$. Such chemical modification of $Zr(OPr)_4$ was carried out for 12 h at 40° C. with continued stirring, and gave what we call solution H.

At time $t_0$, while strongly stirring sol G, we quickly poured solution H into sol G. With gentler stirring for 2 hours, we let the resulting mixed sol I mature at 40° C.; then we brought it back to room temperature. We filled the microporous zircon tube with sol I by suction, maintained it full for 15 seconds, and then drained it smoothly.

We dried the coating obtained above at 40° C. in wet atmosphere for 2 hours, and then fired it at 1100° C. for 5 hours. Thus, we finally obtained a porous zircon membrane with pore size around 30–50 nm.

Example 4

We repeated example 2 except for the firing temperature, which was 1200° C. In this case the final coating was a dense (non porous) zircon layer.

What is claimed is:
1. A process to produce an ultra thin zircon coating comprising:
A) mixing (i) a homogenous alcoholic sol resulting from hydrolysis and partial condensation of a silicon alkoxide with (ii) a homogenous solution of a zirconium compound chelated in an alcohol and (iii) in the presence of a doping agent being soluble in the resulting mixture and promoting zircon crystallization, with proportions of the sol and the solution yielding a molar ratio Si/Zr close or equal to 1, until a homogenous mixed sol is obtained;
B) forming a matured sol containing colloidal particles and/or polymeric entities by a procedure selected from:
(i) stirring the mixed sol for approximately 30 minutes to 24 hours to obtain the matured sol, and
(ii) gelling the mixed sol, drying and forming a powder of the resultant gel, and mixing the powder with acidified water to obtain the matured sol;
C) forming a coating of the matured sol on a microporous substrate;
D) drying the sol coating sufficiently slowly to convert the sol coating to a gel coating and avoid flaws in the gel coating;
E) firing the gel coating on the substrate at a temperature of 900° to 1500° C. to form an adherent ultra thin zircon layer on the microporous substrate.
2. The process of claim 1 wherein the silicon alkoxide is tetraethylorthosilicate.
3. The process of claim 1 wherein the zirconium compound is zirconium tetra-n-propoxide.
4. The process of claim 1 wherein the zirconium compound is chelated by acetylacetone or triethanolamine.
5. The process of claim 1 wherein the doping agent is a copper salt.
6. The process of claim 5 wherein the copper salt is $CuCl_2.2H_2O$ or $Cu(CH_3COO)_2.H_2O$.
7. The process of claim 1 wherein the molar ratio water/silicon alkoxide is between 4 and 20.
8. The process of claim 1 wherein the molar ratio chelating compound/zirconium compound is between 0.1 and 1.
9. The process of claim 1 wherein the molar ratio doping agent/(silicon alkoxide+zirconium compound) is between 0.01 and 0.25.

10. The process of claim 1 wherein the sum of the molar concentrations of the silicon alkoxide in the sol and of the zirconium compound in the alcoholic solution is between 0.1 and 2 moles/litre.

11. The process of claim 1 wherein the pH of the alcoholic sol is acidic.

12. The process of claim 11 wherein the pH of the alcoholic sol is made basic.

13. The process of claim 1 wherein the firing is at a temperature of 1000°–1120° C.

14. The process of claim 13 wherein the firing is at a temperature between 1150° and 1250° C.

* * * * *

UNITED STATES PATENT AND TRADEMARK OFFICE
CERTIFICATE OF CORRECTION

PATENT NO. : 5,292,553
DATED : March 8, 1994
INVENTOR(S) : Philippe Jean Albert Marcel Leture, Alain Dauger and Michel Prassas It is certified that error appears in the above-indentified patent and that said Letters Patent is hereby corrected as shown below:

Column 1, line 29, "Solgel" should be "sol-gel"
Column 2, line 32, delete "and"
Column 4, line 32, "Zr(OPr)." should be "Zr(OPr)$_4$"

Column 4, line 56, insert "of" before "nitric"

Column 4, line 68, "Zr(OPr)" should be "Zr(OPr)$_4$"

Signed and Sealed this

Second Day of August, 1994

Attest:

BRUCE LEHMAN

Attesting Officer       Commissioner of Patents and Trademarks